(12) United States Patent
Pons

(10) Patent No.: US 12,531,466 B2
(45) Date of Patent: Jan. 20, 2026

(54) ELECTRONIC DEVICE WITH VOLTAGE LINEAR REGULATOR AND METHOD OF OPERATING THEREOF

(71) Applicant: STMicroelectronics (Alps) SAS, Grenoble (FR)

(72) Inventor: Alexandre Pons, Vizille (FR)

(73) Assignee: STMicroelectronics (ALPS) SAS, Grenoble (FR)

(*) Notice: Subject to any disclaimer, the term of this patent is extended or adjusted under 35 U.S.C. 154(b) by 237 days.

(21) Appl. No.: 18/461,950

(22) Filed: Sep. 6, 2023

(65) Prior Publication Data

US 2024/0126315 A1    Apr. 18, 2024

(30) Foreign Application Priority Data

Oct. 5, 2022 (FR) ..................................... 2210179

(51) Int. Cl.
| | | |
|---|---|---|
| *G05F 1/59* | (2006.01) | |
| *G05F 1/56* | (2006.01) | |
| *G05F 1/575* | (2006.01) | |
| *H02M 1/00* | (2006.01) | |
| *G05F 1/595* | (2006.01) | |

(52) U.S. Cl.
CPC .......... *H02M 1/0045* (2021.05); *G05F 1/561* (2013.01); *G05F 1/575* (2013.01); *G05F 1/59* (2013.01); *G05F 1/595* (2013.01)

(58) Field of Classification Search
CPC ............. G05F 1/575; G05F 1/561; G05F 1/59
See application file for complete search history.

(56) References Cited

U.S. PATENT DOCUMENTS

| | | | |
|---|---|---|---|
| 10,671,105 B2* | 6/2020 | Mills | ......................... G05F 1/59 |
| 2008/0084195 A1* | 4/2008 | Frew | ....................... G06F 1/305 |
| | | | 323/282 |
| 2012/0292999 A1 | 11/2012 | Henkel et al. | |
| 2018/0284826 A1* | 10/2018 | Sautto | ................. H03F 3/45273 |

FOREIGN PATENT DOCUMENTS

CN          111742477 A       10/2020

* cited by examiner

*Primary Examiner* — Gary L Laxton
*Assistant Examiner* — Jonathan Walter Soileau
(74) *Attorney, Agent, or Firm* — Slater Matsil LLP

(57) ABSTRACT

The present disclosure relates to a device having a supply input receiving a supply voltage, a switched-mode power supply comprising an output at which is generated a supply voltage, and a voltage linear regulator supplying a load, the regulator receiving the supply voltages, the regulator including two transistors coupled between the supply input, respectively the output of the supply, and an output node of the regulator. When the current drawn by the load is below a threshold, an output current delivered to the load is equal to a current flowing through the transistor, so that, when the current drawn by the load is above the threshold, the output current is equal to a current flowing through the transistor plus a current flowing through the transistor.

23 Claims, 3 Drawing Sheets

ELECTRONIC DEVICE WITH VOLTAGE LINEAR REGULATOR AND METHOD OF OPERATING THEREOF

CROSS-REFERENCE TO RELATED APPLICATIONS

This application claims the priority benefit of French Patent Application No. 2210179, filed on Oct. 10, 2022, entitled "Dispositif électronique," which is hereby incorporated herein by reference to the maximum extent allowable by law.

TECHNICAL FIELD

The present disclosure generally relates the electronic devices and methods, and, more particularly, to devices comprising a voltage linear regulator and methods of operating thereof.

BACKGROUND

In electronics, a linear regulator is a voltage regulator based on an active component operating in its linear area or on a passive component, such as a Zener diode, operating in its reverse area.

A Low DropOut (LDO) voltage regulator is a type of voltage linear regulator capable of regulating the output voltage even when the power supply voltage is in the vicinity of the output voltage.

SUMMARY

One embodiment addresses all or some of the drawbacks of known electronic devices.

An embodiment provides an electronic device comprising:
a first supply input configured to receive a first supply voltage;
a first switched-mode power supply comprising a first output, the first switched-mode power supply being configured to generate a second supply voltage at the first output; and
a voltage linear regulator configured to supply a load included in the device, the regulator being configured to receive the first and second supply voltages, the regulator comprising:
a first transistor coupled between the first supply input and an output node of the regulator; and
a second transistor coupled between the output of the first switched-mode power supply and the output node of the regulator,
the regulator being configured so that, when the current, drawn by the load, is below a threshold, a first output current, delivered to the load by the output node of the regulator, is equal to a third current flowing through the second transistor, and so that, when the current is above the threshold, the first output current is equal to the addition of a fourth current flowing through the first transistor and the third current flowing through the second transistor, the fourth current being non-zero.

Another embodiment provides a method for controlling an electronic device comprising:
a first supply input receiving a first supply voltage;
a first switched-mode power supply comprising a first output, the first switched-mode power supply generating a second supply voltage at the first output; and
a voltage linear regulator supplying a load included in the device, the regulator receiving the first and second supply voltages, the regulator comprising:
a first transistor coupled between the first supply input and an output node of the regulator; and
a second transistor coupled between the output of the first switched-mode power supply and the output node of the regulator,
when the current, drawn by the load, is below a threshold, a first output current, delivered to the load by the output node of the regulator, is equal to a third current flowing through the second transistor, and when the current is above the threshold, the first output current is equal to the addition of a fourth current flowing through the first transistor and the third current flowing through the second transistor, the fourth current being non-zero.

According to an embodiment, the regulator is configured so that when the current drawn by the load is above the threshold, the greater the drawn current, the greater the fourth current flowing through the first transistor.

According to an embodiment, the regulator comprises:
an error amplifier configured to receive as an input a set point voltage, and a voltage representative of the output voltage of the regulator, and configured to generate an error voltage;
a voltage-to-current converter, comprising an input configured to receive the error voltage, and generating a fifth current at a second output of the converter, and a sixth current at a third output of the converter; and
a first gate-driving circuit driving the first transistor, and a second gate-driving circuit driving the second transistor, the converter being configured to deliver the fifth current to the first driving circuit, and the sixth current to the second driving circuit.

According to an embodiment, the regulator comprises a voltage dividing bridge the input of which is coupled with the output node of the regulator, and the output of which is coupled with an input of the amplifier such a way to deliver the voltage representative of the output voltage.

According to an embodiment, the converter comprises a third transistor coupled between a first node and a node for applying a reference voltage, the third transistor being configured to be controlled by the error voltage, the converter comprising a fourth transistor coupling the first node with the second output and at least one fifth transistor coupling the first node with the third output.

According to an embodiment, the first node and the third output are coupled via a set of at least two fifth transistors connected in parallel.

According to an embodiment, the second gate-driving circuit comprises a sixth transistor diode-coupled between the second output of the converter and the output of the first switched-mode power supply, the driving terminal of the sixth transistor being coupled with an output of the second driving circuit.

According to an embodiment, the second driving circuit comprises:
a seventh transistor diode-coupled between an input configured to receive a set point current and the output of the first switched-mode power supply, and
an eighth transistor coupled between the second output of the converter and the output of the first switched-mode power supply, the driving terminal of the eighth transistor being coupled with the driving terminal of the seventh transistor.

According to an embodiment, the first gate-driving circuit comprises a ninth diode-connected transistor, the ninth transistor and a resistor being coupled between the first output of the converter and the first input of the device, the driving terminal of the ninth transistor being coupled with an output of the first driving circuit.

According to an embodiment, the first gate-driving circuit comprises:
- a tenth transistor diode-connected between an input configured to receive a set point current and the first input of the device, and
- an eleventh transistor coupled between the first output of the converter and the first input of the device, the driving terminal of the tenth transistor being coupled with the driving terminal of the eleventh transistor.

According to an embodiment, the first driving circuit comprises:
- a twelfth transistor coupled between the first output of the converter and the first input of the device;
- a first switch coupled between the driving terminal of the twelfth transistor and the input configured to receive the set point current; and
- a second switch coupled between the driving terminal of the twelfth transistor and the first input of the device.

According to an embodiment, the device comprises at least one second switched-mode power supply, and comprises for each second switched-mode power supply, a second transistor, coupled between the output of the corresponding second switched-mode power supply and the output node, the regulator being configured so that only a current flowing through one of the second transistors is non-zero at once.

BRIEF DESCRIPTION OF THE DRAWINGS

The foregoing features and advantages, as well as others, will be described in detail in the following description of specific embodiments given by way of illustration and not limitation with reference to the accompanying drawings, in which.

DETAILED DESCRIPTION OF ILLUSTRATIVE EMBODIMENTS

Like features have been designated by like references in the various figures. In particular, the structural and/or functional features that are common among the various embodiments may have the same references and may dispose identical structural, dimensional and material properties.

For the sake of clarity, only the operations and elements that are useful for an understanding of the embodiments described herein have been illustrated and described in detail.

Unless indicated otherwise, when reference is made to two elements connected together, this signifies a direct connection without any intermediate elements other than conductors, and when reference is made to two elements coupled together, this signifies that these two elements can be connected or they can be coupled via one or more other elements.

In the following disclosure, unless indicated otherwise, when reference is made to absolute positional qualifiers, such as the terms "front", "back", "top", "bottom", "left", "right", etc., or to relative positional qualifiers, such as the terms "above", "below", "higher", "lower", etc., or to qualifiers of orientation, such as "horizontal", "vertical", etc., reference is made to the orientation shown in the figures.

Unless specified otherwise, the expressions "around", "approximately", "substantially" and "in the order of" signify within 10%, and preferably within 5%.

Figure 1:
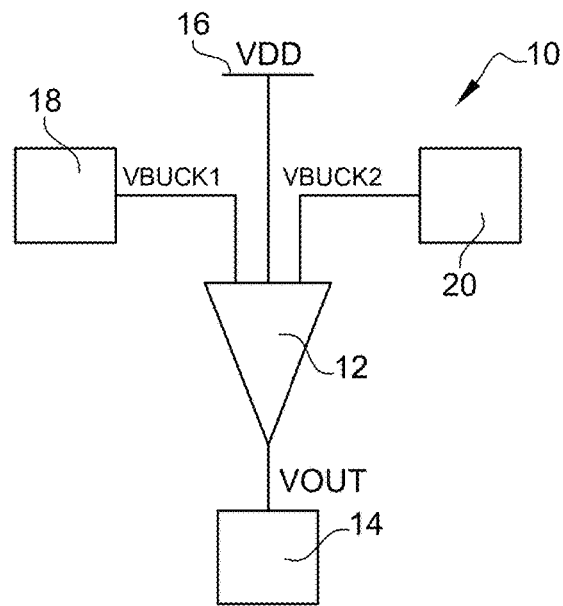
FIG. 1 illustrates an embodiment of an electronic device comprising a voltage linear regulator.

FIG. 1 illustrates an embodiment of an electronic device 10 comprising a voltage linear regulator 12. The voltage regulator 12 is a low dropout voltage regulator or LDO regulator.

The regulator 12 is configured to energize a load 14. The load 14 is for example an analog circuit. The load 14 is for example a logic circuit. The load 14 is for example an analog circuit controlling a switched-mode power supply (SMPS).

The regulator 12 comprises an output at which an output voltage VOUT is generated. The voltage VOUT is the power supply voltage of the circuit 14. The output is coupled, preferably connected, to a supply input of the circuit 14.

The device 10 can for example operate in a low power mode. In order to guarantee a low power, the regulator 12 can be supplied by at least two voltage sources, at least one having a value less than the supply voltage of the device 10. The voltage sources delivering different supply voltages. The regulator 12 generates the output voltage VOUT from one of the power supply voltages. The regulator generates a current IOUT at the output.

In the example of FIG. 1, the regulator 12 is coupled with three supply sources. The regulator 12 may thus be supplied by one or more of these voltage sources. According to the load 14 and according to the power used by the load 14, the power supply voltage of the regulator may come from one of these sources, or from several of them.

The regulator 12 is for example supplied by a supply voltage VDD of the device 10. The voltage VDD is for example higher than 3 V, for example equal to 5 V. In other words, the regulator 12 comprises a supply input coupled with, preferably connected to, a node 16 for applying the voltage VDD. The regulator thus receives at the input a current IBAT.

The regulator 12 is for example supplied by at least one voltage generated by a switched-mode power supply. In the example of FIG. 1, the device comprises two switched-mode power supplies 18 and 20. Each of the power supplies 18 and 20 thus comprises an output coupled with, preferably connected to, a supply input of the regulator 12. For example, the power supplies 18 and 20 are down-converting supplies (buck).

The power supply 18 generates a supply voltage VBUCK1 at the output coupled with, preferably connected to, the regulator 12. The regulator 12 thus receives the voltage VBUCK1 at a supply input. Similarly, the power supply 18 generates a current IBUCK1 at the output. The regulator 12 thus receives the current IBUCK1 at a supply input. Similarly, the power supply 20 generates a supply voltage VBUCK2 at the output coupled with, preferably connected to, the regulator 12. The regulator 12 thus receives the voltage VBUCK2 at a supply input. Similarly, the power supply 20 generates a current IBUCK2 at the output. The regulator 12 thus receives the current IBUCK2 at a supply input. The voltages VBUCK1 and VBUCK2 are for example lower than the power supply voltage VDD, for example lower than 3.3 V.

The power supplies 18 and 20 are preferably different. The power supplies 18 and 20 are for example configured to supply different ranges of voltage or current.

The device 10 is preferably configured so that only one of the power supplies 18 and 20 can be active at once. In other words, if the regulator 12 is supplied by the power supply 18, the regulator is not supplied by the power supply 20. Similarly, if the regulator 12 is supplied by the power supply 20, the regulator is not supplied by the power supply 18. The device 10 is thus configured such a way that the regulator 12 does not receive non-zero currents IBUCK1 and IBUCK2 at once.

The device 10 is configured such a way that the current IOUT is equal to the addition of the current IBAT and the current IBUCK, the current IBUCK corresponding to the current IBUCK1 or to the current IBUCK2, according to the power supply 18 or 20 supplying the regulator.

The current IBAT is configured to be determined by the following equation: IBAT=β*IBUCK−IOS, IOS being a constant value, and β being for example a variable, for example depending on the current used by the load. Preferably, the larger the current requested by the load, the higher the value β.

During the operation of the regulator, for example in low power mode, as the value β is so that the value of the term β *IBUCK is lower than the value of the constant IOS, the value of the current IBAT is zero, the value of the current IBAT could not be negative. The current IOUT is thus equal to the current IBUCK.

During the operation of the regulator, for example in low power mode, as the value β is so that the value of the term β *IBUCK is higher than the value of the constant IOS, the value of the current IBAT is not zero. Thus, the current IOUT depends on the value of the current IBAT and of the current IBUCK. The value VOUT depends on the value of the voltage VDD and of the voltage VBUCK. The regulator is thus supplied by the supply voltage VDD and by the power supply 18 or 20 delivering the voltage VBUCK.

Thus, as the current used by the load is lower than a threshold, the regulator is supplied by a switched-mode power supply, and as the current used by the load is higher than the threshold, the regulator is supplied by the switched-mode power supply and by the supply voltage source VDD. Preferably, the greater the current used by the load, the larger the part of the current IOUT constituted by the current IBAT.

Figure 2:
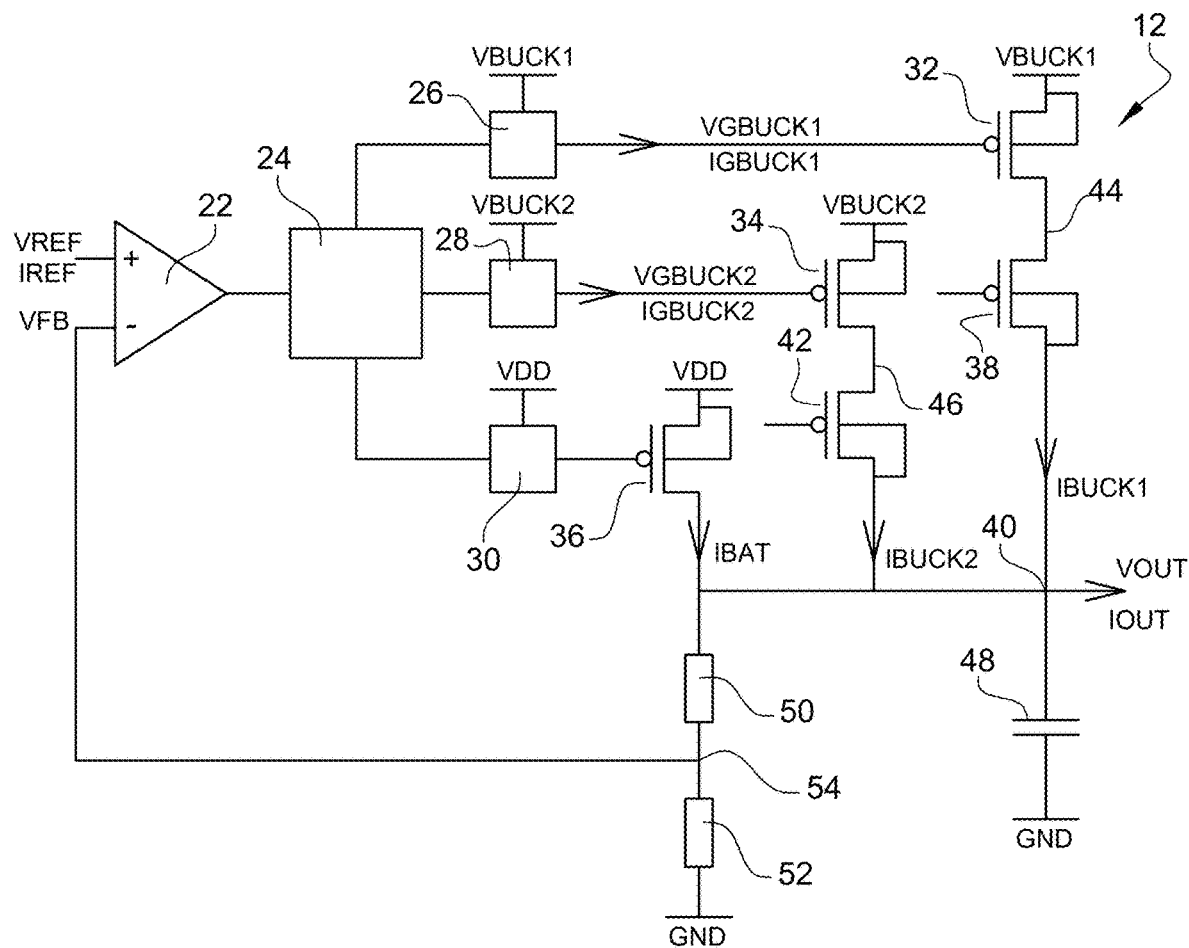
FIG. 2 illustrates an embodiment of a voltage linear regulator.

FIG. 2 illustrates an embodiment of the voltage linear regulator 12.

The regulator 12 comprises an error amplifier 22. The amplifier 22 is for example an operational amplifier. The amplifier 22 comprises a first input, for example a positive input (+), at which are delivered a set point voltage VREF and a current IREF. The first input is thus coupled with, preferably connected to, a node for applying the voltage VREF. The amplifier 22 comprises a second input, for example a negative input (−), at which a loop voltage VFB is applied. The loop voltage depends on the output voltage VOUT, is for example proportional to the output voltage VOUT.

The regulator 12 comprises a voltage-to-current converter (V to I converter) 24. The converter 24 comprises an input coupled with, preferably connected to, an output of the amplifier 22. The converter 24 comprises at least two outputs, each output delivering a current representative of the voltage received as an input by the converter 24.

The regulator 12 comprises gate-driving circuits 26, 28, 30. The regulator 12 comprises as many gate-driving circuits as possible supply sources for the regulator 12. In other words, in the example of FIG. 1, the regulator 12 comprises the gate-driving circuit 30 associated with the source of the voltage VDD and the gate-driving circuits 26, and 28 associated with the power supplies 18 and 20, respectively.

The driving circuits 26, 28, and 30 are configured to receive each a current generated by the converter 24. Thus, each circuit 26, 28, 30 comprises an input coupled with, preferably connected to, an output of the converter 24.

Preferably, the converter 24 is configured so that the current supplied to the gate-driving circuits 26 and 28, i.e. the gate-driving circuits associated with the switched-mode power supplies 18 and 20, that is n times higher than the current supplied to the gate-driving circuit 30, i.e. the driving circuit associated with the source of the supply voltage VDD. The value n is preferably an integer value, for example positive, for example higher than two.

Each gate-driving circuit is configured to receive the supply voltage to which it is associated. Thus, the circuits 26 and 28 receive the voltage VBUCK1 and VBUCK2, respectively, and the circuit 30 receives the voltage VDD. In other words, the circuit 26 comprises a supply input coupled with, preferably connected to, a node for applying the voltage VBUCK1, for example the output of the power supply 18. The circuit 28 comprises a supply input coupled with, preferably connected to, a node for applying the voltage VBUCK2, for example the output of the power supply 20. The circuit 30 comprises a supply input coupled with, preferably connected to, a node for applying the voltage VDD.

Each gate-driving circuit 26, 28, 30 generates a driving voltage of a gate of a transistor. The circuit 26 generates the gate-driving voltage VGBUCK1 of a transistor 32. The circuit 28 generates the gate-driving voltage VGBUCK2 of a transistor 34. The circuit 30 generates the gate-driving voltage VGBAT of a transistor 36.

The transistor 32 is connected in series with a transistor 38 between a node for applying the voltage VBUCK1 and an output node 40, at which is generated the output voltage VOUT of the regulator 12. The transistor 34 is connected in series with a transistor 42 between a node for applying the voltage VBUCK2 and the output node 40. The transistor 36 is connected between a node for applying the voltage VDD and the output node 40.

The transistors 32, 34, 36, 38, 42 are for example insulated-gate field-effect transistors (MOSFET). For example, the transistors 32, 34, 36, 38, 42 are P-channel transistors.

A conduction terminal, for example the source, of the transistor 32 is coupled with, preferably connected to, the node for applying the voltage VBUCK1, and another conduction terminal, for example the drain, of the transistor 32 is coupled with, preferably connected to, a node 44. A conduction terminal, for example the source, of the transistor 38 is coupled with, preferably connected to, the node 40, and another conduction terminal, for example the drain, of the transistor 38 is coupled with, preferably connected to, the node 44. The body of the transistor 32 is for example coupled with, preferably connected to, the node for applying the voltage VBUCK1. The body of the transistor 38 is for example coupled with, preferably connected to, the node 40.

A conduction terminal, for example the source, of the transistor 34 is coupled with, preferably connected to, the node for applying the voltage VBUCK2, and another conduction terminal, for example the drain, of the transistor 34 is coupled with, preferably connected to, a node 46. A conduction terminal, for example the source, of the transistor 42 is coupled with, preferably connected to, the node 40, and another conduction terminal, for example the drain, of the transistor 42 is coupled with, preferably connected to, the node 44. The body of the transistor 34 is for example coupled with, preferably connected to, the node for applying the voltage VBUCK2. The body of the transistor 42 is for example coupled with, preferably connected to, the node 40.

A conduction terminal, for example the source, of the transistor 36 is coupled with, preferably connected to, the node for applying the voltage VDD, and another conduction terminal, for example the drain, of the transistor 36 is coupled with, preferably connected to, the node 40.

The current flowing through the transistor 36, i.e. the current reaching the node 40 from the node for applying the voltage VDD, is the current IBAT. The current flowing through the transistor 34 and the transistor 42, that is the current reaching the node 40 from the node for applying the voltage VBUCK2, is the current IBUCK2. The current flowing through the transistor 32 and the transistor 44, i.e. the current reaching the node 40 from the node for applying the voltage VBUCK1, is the current IBUCK1.

The output current IOUT, i.e. the courant delivered at the output of the regulator 12, corresponds to the addition of the currents IBAT, IBUCK1, and IBUCK2, the currents IBUCK1 and IBUCK2 couldn't be non-zero at once.

The regulator 12 comprises a control circuit not illustrated. The control circuit is configured to generate the control voltages of the transistors 38 and 42.

The regulator 12 comprises for example a capacitor 48 coupled between the node 40 and a node for applying a reference voltage GND, for example ground. In other words, a terminal of the capacitor 48 is coupled with, preferably connected to, the node 40 and another terminal of the capacitor 48 is coupled with, preferably connected to, the node for applying the voltage GND.

The regulator comprises two resistors 50 and 52. The resistors 50 and 52 form a voltage dividing bridge generation the voltage VFB. The resistors 50 and 52 are connected in series between the node 40 and the node for applying the voltage GND. A terminal of the resistor 50 is coupled with, preferably connected to, the node 40 and another terminal of the resistor 50 is coupled with, preferably connected to, a node 54 at which the voltage VFB is generated. A terminal of the resistor 52 is coupled with, preferably connected to, the node 54 and another terminal of the resistor 52 is coupled with, preferably connected to, the node for applying the voltage GND. The node 54 is coupled with, preferably connected to, the second input of the amplifier 22. The node 40 thus corresponds to the input node of the voltage dividing bridge and the node 54 corresponds to the output node of the voltage dividing bridge.

Figure 3:
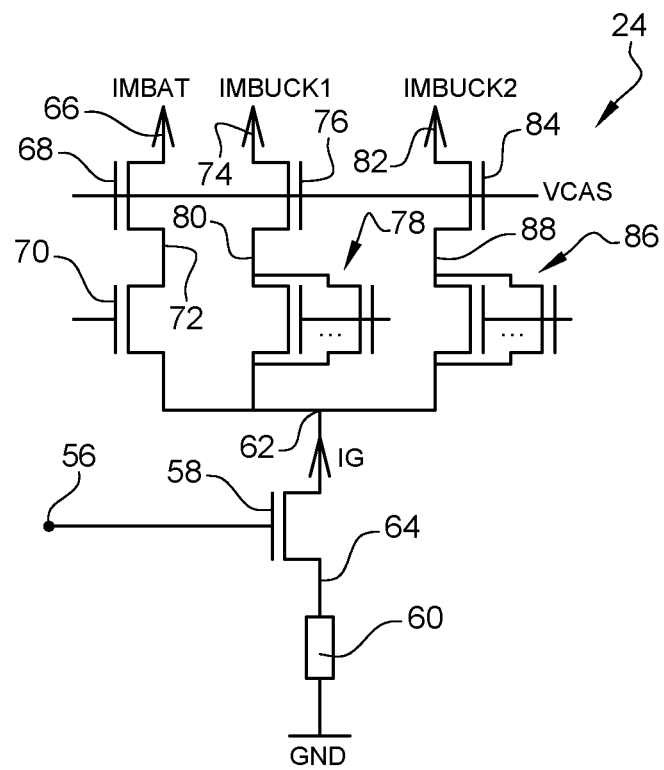
FIG. 3 illustrates in more detail a part of the embodiment of FIG. 2.

FIG. 3 illustrates in more detail a part of the embodiment of FIG. 2. More precisely, FIG. 3 illustrates an embodiment of the V to I converter 24 of FIG. 2.

The converter 24 comprises an input 56 coupled with, preferably connected to, the output of the amplifier 22.

The converter comprises a transistor 58. The transistor 58 is for example a MOSFET transistor, for example an N-channel transistor. The transistor 58 is controlled by the input voltage, i.e. the voltage delivered at node 56 by the amplifier 22. The driving terminal of the transistor 58 is coupled with, preferably connected to, the node 56.

The converter comprises a resistor 60. The resistor 60 is connected in series to the transistor 58 between a node 62 and a node for applying the reference voltage GND. In other words, a conduction terminal of the transistor 58, for example the drain, is coupled with, preferably connected to, the node 62, and another conduction terminal of the transistor 58, for example the source, is coupled with, preferably connected to, a node 64. The transistor 58 and the resistor 60 are flowed through by a current IG.

The node 62 is coupled with an output node 66 of the converter 24. The converter 24 delivers, via the output 66, a current IMBAT. The current IMBAT is the current supplied to the driving circuit 30 of FIG. 2.

The converter 24 comprises a transistor 68 and a transistor 70. The transistors 68 and 70 are preferably MOSFET transistors, for example N-channel transistors. The transistors 68 and 70 are connected in series between the node 62 and the output 66. In other words, a conduction terminal, for example the drain, of the transistor 68 is coupled with, preferably connected to, the output 66, and another conduction terminal, for example the source, of the transistor 68 is coupled with, preferably connected to, a node 72. A conduction terminal, for example the drain, of the transistor 70 is coupled with, preferably connected to, the node 72, and another conduction terminal, for example the source, of the transistor 70 is coupled with, preferably connected to, the node 62.

The node 62 is coupled with an output node 74 of the converter 24. The converter 24 delivers, via the output 74, a current IMBUCK1. The current IMBUCK1 is the current supplied to the driving circuit 26 of FIG. 2.

The converter 24 comprises a transistor 76 and a set of transistors 78. The transistor 76 and the transistors of the set 78 are for example MOSFET transistors, for example N-channel transistors. The set of transistors 78 comprises n transistors, connected in parallel. In other words, the drains of the transistors of the set 78 are coupled with, preferably connected to, each other and the sources of the transistors of the set 78 are coupled with, preferably connected to, each other. Further, the driving terminals of the transistors of the set 78 are coupled with, preferably connected to, each other.

The transistor 76 and the set 78 are connected in series between the node 62 and the output 74. In other words, a conduction terminal, for example the drain, of the transistor 76 is coupled with, preferably connected to, the output 74 and another conduction terminal, for example the source, of the transistor 76 is coupled with, preferably connected to, a node 80. A conduction terminal, for example the drain, of the set 78, i.e. the drains of the transistors of the set 78, is coupled with, preferably connected to, the node 80, and another conduction terminal, for example the source, of the set 78 is coupled with, preferably connected to, the node 62.

The node 62 is coupled to an output node 82 of the converter 24. The converter 24 delivers, via the output 82, a current IMBUCK2. The current IMBUCK2 is the current supplied to the driving circuit 28 of FIG. 2.

The converter 24 comprises a transistor 84 and a set of transistors 86. The transistor 84 and the transistors of the set 86 are for example MOSFET transistors, for example N-channel transistors. The set of transistors 86 comprises several transistors preferably as many transistors as the set 78, preferably n transistors, connected in parallel. In other words, the drains of the transistors of the set 86 are coupled with, preferably connected to, each other, and the sources of the transistors of the set 86 are coupled with, preferably connected to, each other. Further, the driving terminals of the transistors of the set 86 are coupled with, preferably connected to, each other.

The transistor 84 and the set 86 are connected in series between the node 62 and the output 82. In other words, a conduction terminal, for example the source, of the transistor 84 is coupled with, preferably connected to, the output 82 and another conduction terminal, for example the drain, of the transistor 84 is coupled with, preferably connected to, a node 88. A conduction terminal, for example the source, of the set 86, i.e. the sources of the transistors of the set 86, is coupled with, preferably connected to, the node 88, and another conduction terminal, for example the drain, of the set 86, i.e. the drains of the transistors of the set 86, is coupled with, preferably connected to, the node 62.

The driving terminals of the transistors 68, 76, and 84 are coupled with, preferably connected to, each other. The transistors 68, 76, and 84 are controlled by a voltage VCAS. The voltage VCAS is a cascode voltage, configured so that the source voltages of the transistors 68, 76, and 84 are identical.

The transistor 70 and the sets 78 and 86 are controlled by voltages generated by the non-illustrated control circuit of the regulator 12. During the operation of the converter 24, the driving voltage of the transistor 70 is so that the transistor 70 is switched-on, for example is equal to the voltage VDD. During the operation of the converter 24, the driving voltage of the set 78 or 86 corresponding to the switched-mode power supply supplying the regulator 12 is so that the set is switched-on, for example is equal to the voltage VDD. The driving voltage of the other set is so that the set is switched-off, for example significantly equal to 0V.

Preferably, the transistors of the set 78 are identical to each other. Preferably, the transistors of the set 86 are identical to each other. Preferably, the transistors of the set 78 are identical to the transistors of the set 86. Preferably, the transistor 70 is identical to the transistors of the sets 78 and 86.

The currents IMBUCK1 and IMBUCK2 are thus n times higher than the current IBAT. The control voltages of the sets 78 and 86 are such that the currents IMBUCK1 and IMBUCK2 cannot be non-zero during the same operating periods.

The current IG is equal, during the operation of the device 10, to the addition of the current IMBAT and of the currents IMBUCK1 and IMBUCK2, one of the currents IMBUCK1 and IMBUCK2 being zero. Thus, the non-zero current among the currents IMBUCK1 and IMBUCK2 is equal to n/(n+1) IG and the current IMBAT is equal to 1/(n+1) IG.

Figure 4:
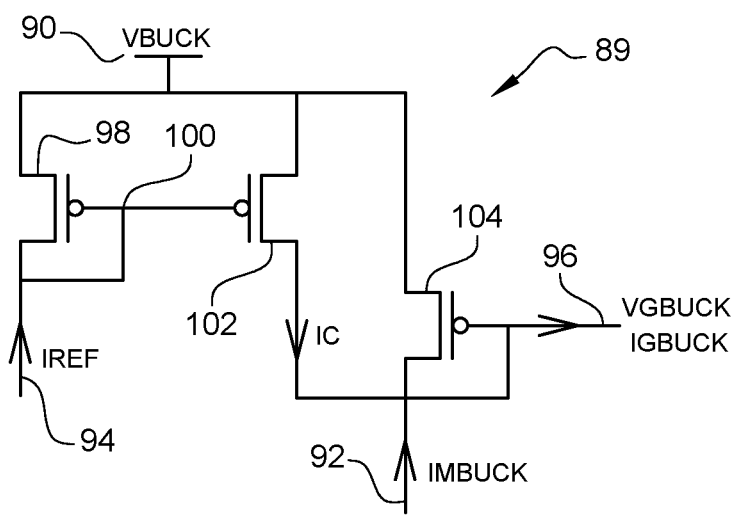
FIG. 4 illustrates in more detail another part of the embodiment of FIG. 2.

FIG. 4 illustrates in more detail another part of the embodiment of FIG. 2. More precisely, the FIG. 4 illustrates an embodiment of a circuit 89. The circuit 89 corresponds to the circuits 26 and 28, i.e. the gate-driving circuits of the transistors 32 and 34, in other words the gate-driving circuits associated with the supply voltages VBUCK1 and VBUCK2. The regulator 12 thus comprises two circuits 89. More generally, the regulator 12 comprises for example as many circuits 89 as possible supply voltages from a switched-mode power supply.

The circuit 89 comprises an input 90 at which is applied the supply voltage VBUCK, corresponding to the voltages VBUCK1 or VBUCK2 according whether the circuit 89 corresponds to the circuit 26 or 28. The circuit 89 comprises an input 92 at which is supplied the current IMBUCK, corresponding to the current IMBUCK1 or to the current IMBUCK2. In other words, the input 92 is coupled with, preferably connected to, the output of the circuit 24 associated to the supply voltage VBUCK. The circuit 89 comprises an input 94 at which is supplied the set point current IREF. The current IREF is for example generated by the control circuit not illustrated described in relation with FIG. 2. The current IREF is for example approximatively constant during the operation of the circuit 89. The circuit 89 comprises an output 96 at which is generated a voltage VGBUCK, corresponding to the voltage VGBUCK1 or the voltage VGBUCK2.

The circuit 89 comprises a transistor 98. The transistor 98 is for example a MOSFET transistor, for example a P-channel transistor. The transistor 98 is coupled between the input 90 and the input 94. In other words, a conduction terminal of the transistor 98, for example the drain, is coupled with, preferably connected to, the input 94 and another conduction terminal of the transistor 98, for example the source, is coupled with, preferably connected to, the input 90. The driving terminal of the transistor 98 is coupled with, preferably connected to, a node 100. The transistor 98 is for example diode-connected. The node 100 is for example coupled with, preferably connected to, the input 94.

The circuit 89 comprises a transistor 102. The transistor 102 is for example a MOSFET transistor, for example a P-channel transistor. The transistor 102 is coupled between the input 90 and the input 92. In other words, a conduction terminal of the transistor 102, for example the drain, is coupled with, preferably connected to, the input 92 and another conduction terminal of the transistor 102, for example the source, is coupled with, preferably connected to, the input 90. The driving terminal of the transistor 102 is coupled with, preferably connected to, the node 100.

The circuit 89 comprises a transistor 104. The transistor 104 is for example a MOSFET transistor, for example a P-channel transistor. The transistor 104 is coupled between the input 90 and the input 92. The transistor 104 is coupled in parallel to the transistor 102. In other words, a conduction terminal of the transistor 104, for example the drain, is coupled with, preferably connected to, the input 92 and another conduction terminal of the transistor 104, for example the source, is coupled with, preferably connected to, the input 90. The driving terminal of the transistor 104 is coupled with, preferably connected to the input 96.

Preferably, the surface of the transistor 32 or 34 to which corresponds the circuit 89 is equal to m times the surface of the transistor 104, m being a constant value, preferably a positive integer value.

The current IBUCK is equal to a times a current IC flowing through the transistor 104. The value α is equal to m as the transistor 32 or 34 is at saturation.

Preferably, the transistors 98 and 102 are identical. The current IMBUCK is thus equal to the addition of the current IC and of the current IREF.

Figure 5:
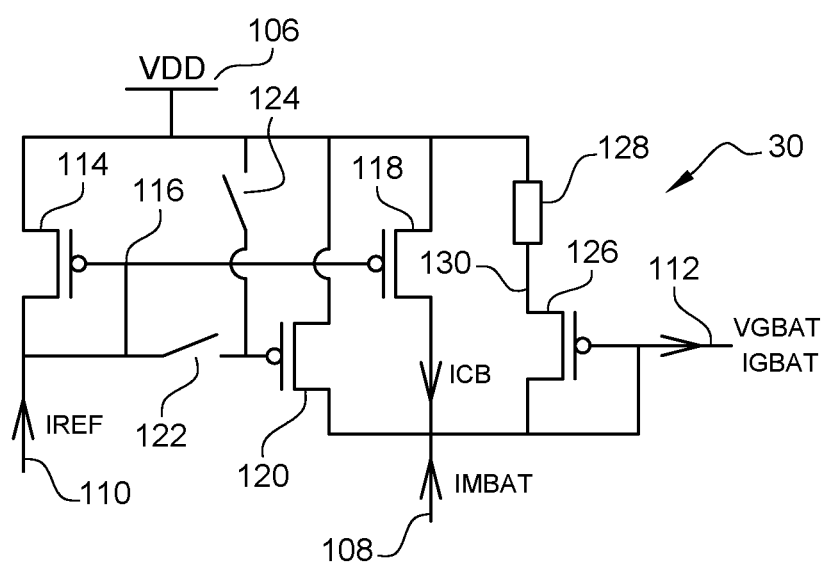
FIG. 5 illustrates in more detail another part of the embodiment of FIG. 2.

FIG. 5 illustrates in more detail another part of the embodiment of FIG. 2. More precisely, FIG. 5 illustrates an embodiment of the circuit 30, i.e. the gate-driving circuit of the transistor 36, in other words the gate-driving circuit associated to the supply voltage VDD.

The circuit 30 comprises an input 106 at which the supply voltage VDD is applied. The circuit 30 comprises an input 108 at which the current IMBAT is supplied. In other words, the input 108 is coupled with, preferably connected to, the output of the circuit 24 associated to the supply voltage VDD. The circuit 30 comprises an input no at which the set point current IREF is supplied. The current IREF is for example generated by the control circuit not illustrated described in relation with FIG. 2. The current IREF is for example approximatively constant during the operation of the circuit 30. The circuit 30 comprises an output 112 at which the voltage VGBAT is generated.

The circuit 30 comprises a transistor 114. The transistor 114 is for example a MOSFET transistor, for example a P-channel transistor. The transistor 114 is coupled between the input 106 and the input 110. In other words, a conduction terminal of the transistor 114, for example the drain, is coupled with, preferably connected to, the input no and another conduction terminal of the transistor 114, for example the source, is coupled with, preferably connected to, the input 106. The driving terminal of the transistor 114 is coupled with, preferably connected to, a node 116. The transistor 114 is for example diode-connected. The node 116 is for example coupled with, preferably connected to, the input 110.

The circuit 30 comprises a transistor 118. The transistor 118 is for example a MOSFET transistor, for example a P-channel transistor. The transistor 118 is coupled between the input 106 and the input 108. In other words, a conduction terminal of the transistor 118, for example the drain, is coupled with, preferably connected to, the input 108 and another conduction terminal of the transistor 118, for example the source, is coupled with, preferably connected to, the input 106. The driving terminal of the transistor 118, is coupled with, preferably connected to, the node 116.

The circuit 30 comprises a transistor 120. The transistor 120 is for example a MOSFET transistor, for example a P-channel transistor. The transistor 120 is coupled between the input 106 and the input 108. The transistor 120 is connected in parallel with the transistor 118. In other words, a conduction terminal of the transistor 120, for example the drain, is coupled with, preferably connected to, the input 108 and another conduction terminal of the transistor 120, for example the source, is coupled with, preferably connected to, the input 106. The driving terminal of the transistor 120 is coupled with the input no via a switch 122. Further, the driving terminal of the transistor 120 is coupled with the input 106 via a switch 124. In other words, a terminal of the switch 122 is coupled with, preferably connected to, the driving terminal of the transistor 120 and another terminal of the switch 122 is coupled with, preferably connected to, the node 116. Similarly, a terminal of the switch 124 is coupled with, preferably connected to, the driving terminal of the transistor 120 and the other terminal of the switch 124 is coupled with, preferably connected to, the input 106. The switches 122 and 124 are for example controlled by the non-illustrated control circuit described in relation with FIG. 2.

The circuit 30 comprises for example a transistor 126 and a resistor 128 connected in series between the input 106 and the input 108. The transistor 128 is for example a MOSFET transistor, for example a P-channel transistor. A terminal of the resistor 128 is for example coupled with, preferably connected to, the input 106 and the other terminal of the resistor 128 is for example coupled with, preferably connected to, a node 130. A conduction terminal of the transistor 126, for example the source, is coupled with, preferably connected to, the node 130 and another conduction terminal of the transistor 126, for example the drain, is coupled with, preferably connected to, the input 108. The driving terminal of the transistor 126 is coupled with, preferably connected to, the output 112 at which is applied the voltage VGBAT. The output 112 is further coupled with, preferably connected to, the input 108, such a way to diode-connect the transistor 126.

Preferably, the surface of the transistor 36 is equal to m times the surface of the transistor 126. The transistor 36 is always at saturation. The current IBAT is thus equal to m times the value of the current ICB, the current ICB being the current flowing through the transistor 126. Further, the current IMBAT is equal to the addition of p times the current IREF and the current ICB, p being a constant value defined by the circuit 24.

Thus, the current IBAT is configured to be determined by the following equation:

$$IBAT = \beta * IBUCK - IOS,$$

$\beta$ being equal to $\dfrac{m}{\alpha * n}$ and $IOS$ being equal to $m * \left(p - \dfrac{1}{n}\right) * IREF$.

As the current used by the load is low, the current IOUT is equal to the current IBUCK, the part IBAT of the current IOUT being zero.

As the voltage drop is high, i.e. as the voltage difference between VBUCK and the regulated voltage is high, the value α becomes equal to the value m, and the current IOUT is equal to the addition of the current IBAT and the current IBUCK, the current IBAT being non-zero and the current IBUCK being equal to n times the current IBAT. The current IOUT is thus mostly delivered by the switched-mode power supply generating IBUCK.

As the voltage drop decreases, the transistor 32 or 34, corresponding to the switched-mode power supply generating a non-zero current, enters the triode region. The value α thus becomes less than the value m. The current IBUCK thus becomes less than n times the current IBAT.

The more the voltage drop decreases, the more the transistor enters the triode region, and the value α becomes increasingly lower than the value m. Thus, the ratio of the value of the current IBUCK on the value of the current IBAT decreases up to become less than 1. The current IBUCK becomes less than the current IBAT. The most part of the current IOUT thus comes from the current IBAT.

Various embodiments and variants have been described. Those skilled in the art will understand that certain features of these embodiments can be combined and other variants will readily occur to those skilled in the art. In particular, although the described embodiments comprise two switched-mode power supplies, it is understood that the device could comprise a single switched-mode power supply, or a larger number of switched-mode power supplies.

Further, although the described embodiments comprise a transistor 70 and sets 78 and 86, the transistor 70 could be replaced with a set of transistors, preferably identical, connected in parallel such as the sets 78 and 86. The sets 78 and 86 then comprise n times more transistors than the set 70.

Finally, the practical implementation of the embodiments and variants described herein is within the capabilities of those skilled in the aft based on the functional description provided hereinabove.

What is claimed is:

1. An electronic device comprising:
    a first supply input configured to receive a first supply voltage;
    a first switched-mode power supply comprising a first output, wherein the first switched-mode power supply is configured to generate a second supply voltage at the first output; and
    a voltage linear regulator configured to supply a load included in the device, the voltage linear regulator being configured to receive the first and second supply voltages, the voltage linear regulator comprising:
        a first transistor coupled between the first supply input and an output node of the voltage linear regulator; and
        a second transistor coupled between an output of the first switched-mode power supply and the output node of the voltage linear regulator;

wherein the voltage linear regulator is configured to:
in response to a second current drawn by the load being below a threshold, deliver, by the output node of the voltage linear regulator, to the load a first output current that is equal to a third current flowing through the second transistor; and
in response to the second current being above the threshold, set the first output current equal to an addition of a fourth current flowing through the first transistor and of the third current flowing through the second transistor, wherein the fourth current is non-zero.

2. The device according to claim 1, wherein the voltage linear regulator is further configured to, in response to the second current drawn by the load being above the threshold, increase the fourth current flowing through the first transistor in accordance with an increase in the drawn current.

3. The device according to claim 1, wherein the voltage linear regulator comprises:
an error amplifier configured to receive as an input a set point voltage, and a voltage representative of the output node of the voltage linear regulator, and configured to generate an error voltage;
a voltage-to-current converter, comprising an input configured to receive the error voltage, and generating a fifth current at a second output of the converter, and a sixth current at a third output of the converter; and
a first gate-driving circuit driving the first transistor, and a second gate-driving circuit driving the second transistor, the converter being configured to deliver the fifth current to the first gate-driving circuit, and the sixth current to the second gate-driving circuit.

4. The device according to claim 3, wherein the voltage linear regulator comprises a voltage dividing bridge, an input of which is coupled to the output node of the voltage linear regulator, and an output of which is coupled to an input of the amplifier in such a way as to deliver the voltage representative of the output node.

5. The device according to claim 3, wherein the converter comprises a third transistor coupled between a first node and a node for applying a reference voltage, the third transistor being configured to be controlled by the error voltage, the converter comprising a fourth transistor coupling the first node to the second output and at least one fifth transistor coupling the first node to the third output.

6. The device according to claim 5, wherein the first node and the third output are coupled via a set of at least two fifth transistors connected in parallel.

7. The device according to claim 5, wherein the second gate-driving circuit comprises a sixth transistor diode-connected between the second output of the converter and the output of the first switched-mode power supply, a driving terminal of the sixth transistor being coupled to an output of the second gate-driving circuit.

8. The device according to claim 7, wherein the second gate-driving circuit 8. comprises:
a seventh transistor diode-connected between an input configured to receive a set point current and the output of the first switched-mode power supply; and
an eighth transistor coupled between the second output of the converter and the output of the first switched-mode power supply, a driving terminal of the eighth transistor being coupled to a driving terminal of the seventh transistor.

9. The device according to claim 3, wherein the first gate-driving circuit comprises a ninth diode-connected transistor, the ninth transistor and a resistor being coupled between a first output of the converter and the first supply input of the device, a driving terminal of the ninth transistor being coupled to an output of the first gate-driving circuit.

10. The device according to claim 9, wherein the first gate-driving circuit comprises:
a tenth transistor diode-connected between an input configured to receive a set point current and the first supply input of the device; and
an eleventh transistor coupled between the first output of the converter and the first supply input of the device, a driving terminal of the tenth transistor being coupled to a driving terminal of the eleventh transistor.

11. The device according to claim 10, wherein the first gate-driving circuit comprises:
a twelfth transistor coupled between the first output of the converter and the first supply input of the device;
a first switch coupled between a driving terminal of the twelfth transistor and the input configured to receive the set point current; and
a second switch coupled between the driving terminal of the twelfth transistor and the first supply input of the device.

12. The device according to claim 1, wherein the device comprises at least one second switched-mode power supply, and comprises, for each second switched-mode power supply, another second transistor, coupled between the output of the corresponding second switched-mode power supply and the output node, the voltage linear regulator being configured so that a current flowing through only one of the second transistors is non-zero at a time.

13. A method for controlling an electronic device, the method comprising:
receiving, by a first supply input, a first supply voltage;
generating, by a first switched-mode power supply, a second supply voltage at a first output of the first switched-mode power supply;
supplying, by a voltage linear regulator, a load included in the device;
receiving, by the voltage linear regulator, the first and second supply voltages, the voltage linear regulator comprising a first transistor coupled between the first supply input and an output node of the voltage linear regulator, and a second transistor coupled between the first output of the first switched-mode power supply and the output node of the voltage linear regulator; and
in response to a second current drawn by the load being below a threshold, delivering, by the output node of the voltage linear regulator, a first output current to the load that is equal to a third current flowing through the second transistor; or
in response to the second current being above the threshold, setting the first output current equal to an addition of a fourth current flowing through the first transistor and of the third current flowing through the second transistor, the fourth current being non-zero.

14. The method according to claim 13, further comprising, in response to the second current drawn by the load being above the threshold, increasing, by the voltage linear regulator, the fourth current flowing through the first transistor in accordance with an increase in the drawn current.

15. The method according to claim 13, further comprising:
- receiving, by an error amplifier of the voltage linear regulator, as an input a set point voltage, and a voltage representative of the output node of the voltage linear regulator;
- generating, by the error amplifier, an error voltage;
- receiving, by an input of a voltage-to-current converter, the error voltage;
- generating, at a second output of the converter, a fifth current;
- generating, at a third output of the converter, a sixth current;
- driving, by a first gate-driving circuit, the first transistor;
- driving, by a second gate-driving circuit, the second transistor; and
- delivering, by the converter, the fifth current to the first gate-driving circuit, and the sixth current to the second gate-driving circuit.

16. The method according to claim 15, further comprising delivering, by an output of a voltage dividing bridge of the voltage linear regulator, the voltage representative of the output node, an input of the voltage dividing bridge being coupled to the output node of the voltage linear regulator, and the output of the voltage dividing bridge being coupled to an input of the amplifier.

17. The method according to claim 15, further comprising:
- coupling, by a third transistor of the converter, a first node and a node for applying a reference voltage, the third transistor being controlled by the error voltage;
- coupling, by a fourth transistor of the converter, the first node to the second output; and
- coupling, by at least one fifth transistor of the converter, the first node to the third output.

18. The method according to claim 17, further comprising coupling, via a set of at least two fifth transistors connected in parallel, the first node and the third output.

19. The method according to claim 15, further comprising coupling, by a sixth diode-connected transistor of the second gate-driving circuit, the second output of the converter and the first output of the first switched-mode power supply, a driving terminal of the sixth transistor being coupled to an output of the second gate-driving circuit.

20. The method according to claim 19, further comprising:
- coupling, by a seventh diode-connected transistor of the second gate-driving circuit, an input receiving a set point current and the output of the first switched-mode power supply; and
- coupling, by an eighth transistor of the second gate-driving circuit, the second output of the converter and the output of the first switched-mode power supply, a driving terminal of the eighth transistor being coupled to a driving terminal of the seventh transistor.

21. The method according to claim 15, further comprising coupling, by a ninth diode-connected transistor and a resistor of the first gate-driving circuit, a first output of the converter and the first supply input of the device, a driving terminal of the ninth transistor being coupled to an output of the first gate-driving circuit.

22. The method according to claim 21, further comprising:
- coupling, by a tenth diode-connected transistor of the first gate-driving circuit, an input configured to receive a set point current and the first supply input of the device; and
- coupling, by an eleventh transistor of the first gate-driving circuit, the first output of the converter and the first supply input of the device, a driving terminal of the tenth transistor being coupled to a driving terminal of the eleventh transistor.

23. The method according to claim 22, further comprising:
- coupling, by a twelfth transistor of the first gate-driving circuit, the first output of the converter and the first supply input of the device;
- coupling, by a first switch of the first gate-driving circuit, a driving terminal of the twelfth transistor and the input configured to receive the set point current; and
- coupling, by a second switch of the first gate-driving circuit, the driving terminal of the twelfth transistor and the first supply input of the device.

* * * * *